United States Patent
Webber

(10) Patent No.: US 8,687,288 B2
(45) Date of Patent: Apr. 1, 2014

(54) DRIVER VISION FIELD EXTENDER

(71) Applicant: James Webber, New York, NY (US)

(72) Inventor: James Webber, New York, NY (US)

(73) Assignee: North East Windows Solutions, LLC, Westbury, NY (US)

( * ) Notice: Subject to any disclaimer, the term of this patent is extended or adjusted under 35 U.S.C. 154(b) by 0 days.

(21) Appl. No.: 13/736,219

(22) Filed: Jan. 8, 2013

(65) Prior Publication Data

US 2013/0182338 A1  Jul. 18, 2013

Related U.S. Application Data

(60) Provisional application No. 61/632,025, filed on Jan. 17, 2012.

(51) Int. Cl.
| | |
|---|---|
| *G02B 3/02* | (2006.01) |
| *G02B 5/12* | (2006.01) |
| *G02B 5/04* | (2006.01) |
| *B60R 1/00* | (2006.01) |
| *G02B 3/08* | (2006.01) |

(52) U.S. Cl.
CPC ............... *B60R 1/005* (2013.01); *G02B 5/045* (2013.01); *G02B 3/08* (2013.01)
USPC ............................ 359/720; 359/527; 359/831

(58) Field of Classification Search
CPC ............ B60R 1/005; G02B 3/08; G02B 5/04; G02B 5/045; G02B 5/12
USPC .......... 359/527, 720, 741, 742, 743, 831, 837
See application file for complete search history.

(56) References Cited

U.S. PATENT DOCUMENTS

| | | | |
|---|---|---|---|
| 1,637,309 A | | 7/1927 | David |
| 1,678,479 A | | 7/1928 | Patten et al. |
| 1,683,951 A | | 9/1928 | Buttron |
| 1,731,284 A | | 10/1929 | Andel et al. |
| 1,808,208 A | | 6/1931 | David |
| 1,826,090 A | | 10/1931 | Phelps |
| 2,109,932 A | | 3/1938 | Schneider |
| 2,549,541 A | | 4/1951 | Squiers |
| 2,602,367 A | | 7/1952 | Falge et al. |
| 2,648,566 A | | 8/1953 | Zeder et al. |
| 2,681,589 A | | 6/1954 | Dow, Jr. et al. |
| 2,704,962 A | | 3/1955 | De Beaubien |
| 3,809,461 A | * | 5/1974 | Baumgardner et al. ...... 359/737 |
| 3,972,596 A | | 8/1976 | Baumgardner et al. |
| 4,286,846 A | | 9/1981 | Bollenbacher |
| 5,280,386 A | | 1/1994 | Johnson |

(Continued)

OTHER PUBLICATIONS

The Fresnel Prism & Lens Co.,3M Press on Prism and Optics, 2011, 1 page.

(Continued)

*Primary Examiner* — David N Spector
(74) *Attorney, Agent, or Firm* — Alfred M. Walker

(57) ABSTRACT

A driver vision field extender uses flexible vinyl Fresnel-type prism lens material with substantially parallel horizontal straight linearly extending prism lines. The parallel lines permit wide side by side views without substantial distortion. As the driver vision field extender is intended to be positioned contiguously along the windshield, the driver vision field extender after installation preferably exhibits a concave shape acting to focus the light defining and delineating overhead objects towards front-seated passengers such as the driver.

16 Claims, 4 Drawing Sheets

(56) References Cited

U.S. PATENT DOCUMENTS

| | | |
|---|---|---|
| 5,899,010 A | 5/1999 | Peck |
| 6,108,141 A | 8/2000 | Gadberry |
| 6,416,835 B1 | 7/2002 | Preston et al. |
| 6,452,731 B1 | 9/2002 | Schorning |
| 6,640,477 B1 | 11/2003 | Timpson et al. |
| 6,836,369 B2 | 12/2004 | Fujikawa et al. |
| 7,232,176 B1 | 6/2007 | Dopwell |
| 7,619,826 B2 | 11/2009 | Watanabe et al. |
| 7,936,422 B2 | 5/2011 | Adachi et al. |
| 7,949,152 B2 | 5/2011 | Schofield et al. |
| 8,031,062 B2 | 10/2011 | Smith |
| 8,035,493 B2 | 10/2011 | Hioki |

OTHER PUBLICATIONS

Gadbeny Light in Sight—OUTMOTORING, 2012, 3 pages.
Gadbeny Light in Sight Website, 2007, 10 pages.
Gadbeny Light in Sight—The GBMINI Website, 2003, 6 pages.

* cited by examiner

DRIVER VISION FIELD EXTENDER

RELATED APPLICATIONS

This application is based upon Provisional Application No. 61/632,025, filed Jan. 17, 2012, which application is incorporated by reference herein. Applicant claims priority under 35 U.S.C. 119(e) therefrom.

FIELD OF THE INVENTION

The present invention related to windshield applied driver vision field extenders.

BACKGROUND OF THE INVENTION

It has long been known that suspended signal lights, signs, and banners at intersections are sometimes difficult to see by a driver without hyper extending or "craning" the neck if the vehicle is too close to the overhead object. The prior art reveals several solutions to this difficulty, but none of the solutions have had commercial success.

A sampling of the relevant prior art follows. Two early patents utilize substantial prism lenses to refract the view above the vehicle into the viewscape of the driver in a normal driving position. The signal viewing attachment of David (U.S. Pat. No. 1,637,309) attaches a semi-circular, plano-sphero-concave lens to a central location in front of the driver a few inches down from the top edge of the windshield. A permanent internal attachment is made using transparent cement. The traffic signal observer of Buttron (U.S. Pat. No. 1,683,951) consists of a triangular crossection prism several inches long which is attached by rigid brackets either to the dash below the lower edge of the windshield, or to the steering column by clamping means.

A multiple use automobile banner by Timpson et al. (U.S. Pat. No. 6,640,477) shows a repositional and reusable automobile advertising banner that stretches across the entire windshield near the top edge. The intent behind the Timpson banner is to enable a car dealership to permit potential customers to take test drives with the banner attached for promotional purposes. As the banner is transparent, its use in the driver's field of view does not violate DOT prohibitions against obstructions to the driver's field of view. The banner is positioned so that it does not extend below 6" from the top edge of the windshield, which is another DOT restriction. The banner is attached to the outer surface of the windshield by static cling whereinafter dealership personnel can write price and other promotional information on the banner conveniently against the solid and substantially planar windshield surface. While this is not a driver vision field extender, some size and attachment features relate to the present invention.

A signal viewing device of Gadberry (U.S. Pat. No. 6,108, 141) uses a vinyl Fresnel-type prism lens. Gadberry's drawings show generally circular concentric prism lines mounted on the inside upper edge of the windshield to extend the driver's field of view. The prism lens is in the general shape of a circular concentric segment. The Gadberry device (i.e., prism lens) is configured to be mounted by wetting the back side of the vinyl lens and then squeezing the water film from the interface between lens and windshield. The length and width of the Gadberry device appear to be about 8' and 2", respectively.

SUMMARY OF THE INVENTION

The present invention provides an driver vision field extender that extends the view upward to compensate for areas obscured by the vehicle roof in a manner that overcomes the shortcomings of the prior art.

The invention is advantageous when utilized under certain circumstances, for example, in the windshield of a truck with a high cabs where the problem of effectively and accurately observing data intended to be conveyed by overhead objects is more often than not more acute that problems associated by passenger cars, as addressed by above-described prior art.

Another advantage of the invention is that a material cost for its manufacture and implementation to accommodate the orientations and size differences between vehicular windshields in minimized while the inherent convenience of its implementation is maximized.

The present invention uses flexible vinyl Fresnel-type prism lens material with substantially parallel horizontal straight prism lines. The parallel lines permit wide side by side views without substantial distortion, which could occur with prior art concentric prism lines which focus at the middle of the concentric rings.

As the driver vision field extender is intended to be positioned contiguously along the entire linear length of the windshield (from side to side), the driver vision field extender after installation preferably exhibits a concave shape acting to focus the light defining and delineating overhead objects towards front-seated passengers such as the driver.

The material comprising the driver vision field extender displays static cling features, which make it easy to attach and reposition the driver vision field extender on a windshield. Although the size and shape of a particular windshield upon which the driver vision field extender is installed may differ, 3M® PRESS-ON OPTICS® material is identical as produced for the optical industry for correcting diplopia. For diplopia, as distinguished from the ability to see focused communications associated with overhead objects according to this invention, the material is simply trimmed to size and then pressed onto an eyeglass lens.

While a lens as small as a 3" by 3" square can be used for this invention in a position on a windshield conducive to a particular driver and repositioned as needed for another driver, for example, near the top edge of the windshield, it is preferable to arrange a length of the material comprising the driver vision field extender along the entire width of the upper portion of the windshield.

But where such application is inopportune, a rectangular lens slightly larger than 3" by 3" would be preferable. And alternate embodiments as long narrow rectangles can be used to span one half of the windshield in a strip less than 6" down from the top windshield edge. Again, these lenses (i.e., driver vision field extenders) can be trimmed to conform to the top windshield contour and for size lengthwise. Longer lenses permit viewing full intersection banners or high signs on either side. The full width strips afford the same viewing capability to a person in a front passenger seat.

A further alternate embodiment is to position the lens upon a portion of the interior rear view mirror to view objects from behind. Please note that in such embodiments the length or surface area of the material comprising the driver vision field extender must be significantly smaller than that of a windshield mounted device.

In general, because the prism lines are substantially parallel, as opposed to concentric, the edges of the viewed object are not distorted. Therefore, the images can be seen in a relatively accurate 3-dimensional configuration.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
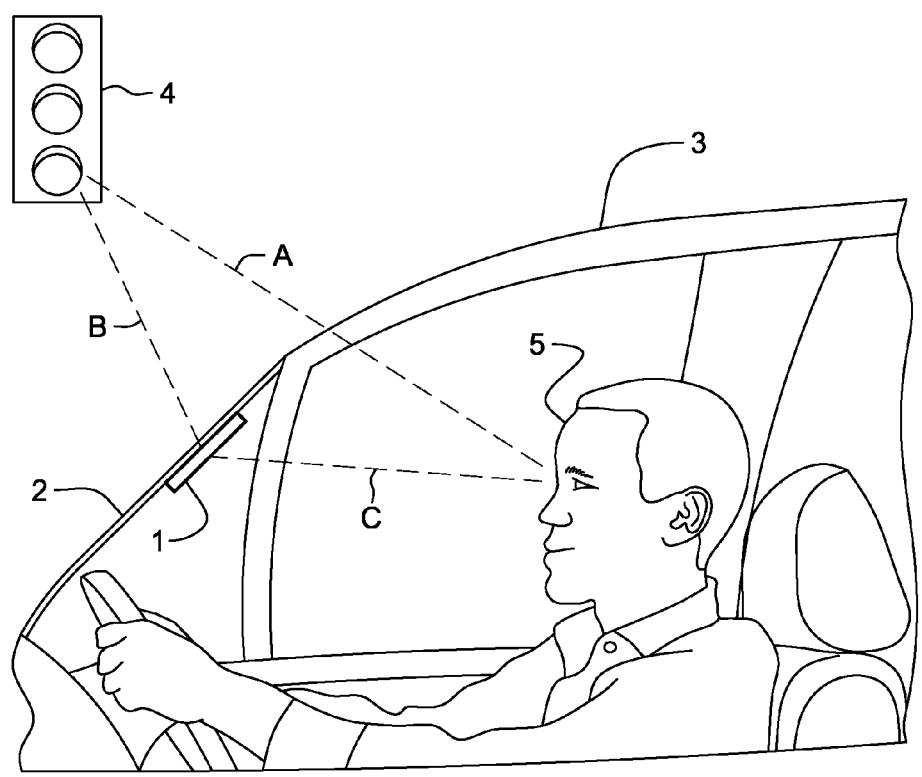
FIG. 1 is a side schematic side view of a driver viewing a traffic signal through an driver vision field extender formed with a Fresnel-type prism lens, whereby direct viewing is otherwise obscured by vehicle roof.

FIG. 1 illustrates a field of view problem solved by this invention. The vehicle is obviously too far forward for driver 5 to view traffic signal 4 while in his normal driving position. Vehicle roof 3 blocks his direct view (A). However, an driver vision field extender formed with Fresnel-type prism lens 1 and mounted to windshield 2 refracts view line (B) via the Fresnel-type prism lens 1 into eyelevel C. While not clear from FIG. 1, the driver vision field extender formed with the Fresnel-type prism lens 1 extends substantially along the entire side to side length of the windshield.

Figure 2:
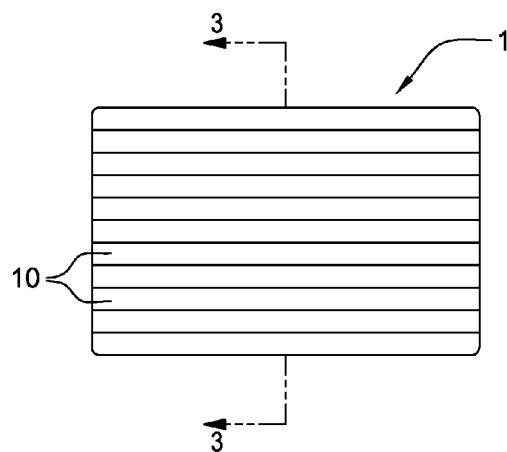
FIG. 2 is a side elevation view of an driver vision field extender formed with a small rectangular fresnel lens.

FIG. 2 shows a preferred embodiment of a small rectangular Fresnel-type prism lens 1 with horizontal prism lines 10 (as distinguished from that embodied in the driver vision field extender of FIG. 1).

Figure 3:
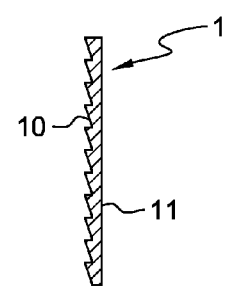
FIG. 3 is an edge view of the crossection of the lens comprising the driver vision field extender of FIG. 2.

FIG. 3 shows the array of prism lenses 10 and their orientation to shift the image down. Note smooth side 11 will cling to the windshield by "static cling".

Figure 4:
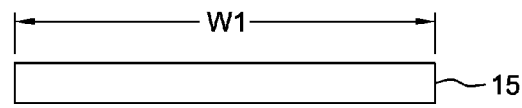
FIG. 4 is a side elevation of an driver vision field extender formed with a Fresnel-type prism lens of half windshield width.

FIG. 4 shows a half-windshield width driver vision field extender formed with lens 15, which can be trimmed to windshield top contour and desired length W1.

Figure 5:
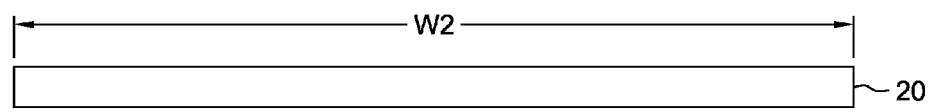
FIG. 5 is a side elevation view of an driver vision field extender formed with a Fresnel-type prism lens of full width size.

FIG. 5 shows a full windshield width an driver vision field extender formed with Fresnel-type prism lens 20 of width W2. Note that lens 15 therein will support full banner or side sign viewing by driver, while lens 20 will afford the same capability to someone in the adjacent passenger seat. Neither devices 15 or 20 should extend below 6" from top of windshield due to possible forward view distortion.

Figure 6:
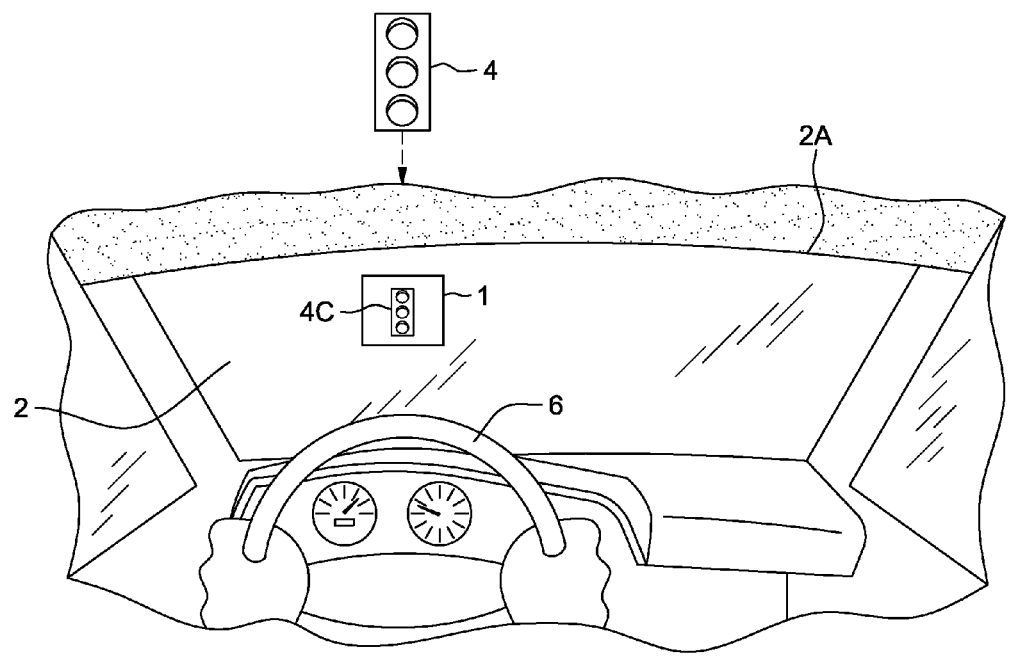
FIG. 6 is a rear view of a motor vehicle windshield showing a first small embodiment of an driver vision field extender formed with a Fresnel-type prism lens of the present invention.

FIG. 6 shows a rear view of a motor vehicle windshield 2 in front of driver's steering wheel 6, highlighting a re-directed view 4C of a traffic signal 4 positioned above the obstructed view line 2A at the top roof line of the windshield 2 of the driver of a motor vehicle. Re-directed view 4C of the traffic signal 4 is shown directed through a first embodiment for a small driver vision field extender formed with a Fresnel-type prism lens 1 (FIG. 1), visible to both a driver of the motor vehicle.

Figure 7:
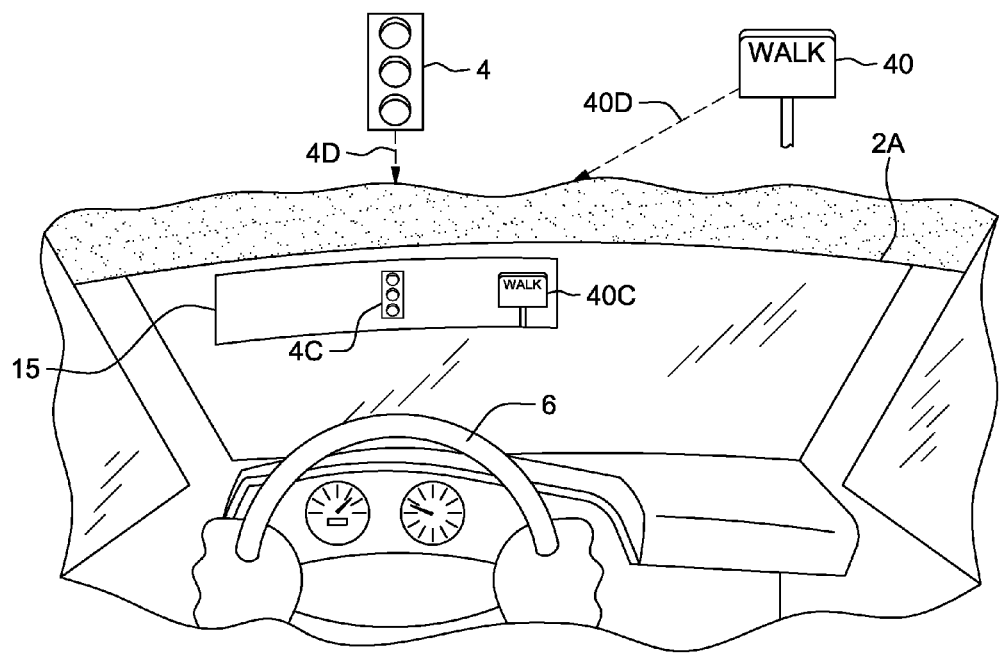
FIG. 7 is a rear view of a motor vehicle windshield showing a second half-windshield width embodiment of an driver vision field extender formed with a Fresnel-type prism lens of the present invention.

FIG. 7 shows a rear view of a motor vehicle windshield 2 in front of driver's steering wheel 6, highlighting a re-directed view 4C of a traffic signal 4 positioned above the obstructed view line 2A at the top roof line of the windshield 2 of the driver of a motor vehicle. The directed view 4C of the signal light 4 is shown directed through a second embodiment for a half-windshield width driver vision field extender formed with Fresnel-type prism lens 15 (FIG. 4) in the vertically downward view directional arrow 4D. Therein, the obliquely placed sidewalk post-mounted "WALK/DON'T WALK" traffic signal 40, is positioned above a sidewalk to the side of the roadway through which a driver is driving a motor vehicle. An image of same is re-directed through half-windshield width driver vision field extender formed with Fresnel-type prism lens 15 (embodying view 40C) at a side portion visible to a driver.

Figure 8:
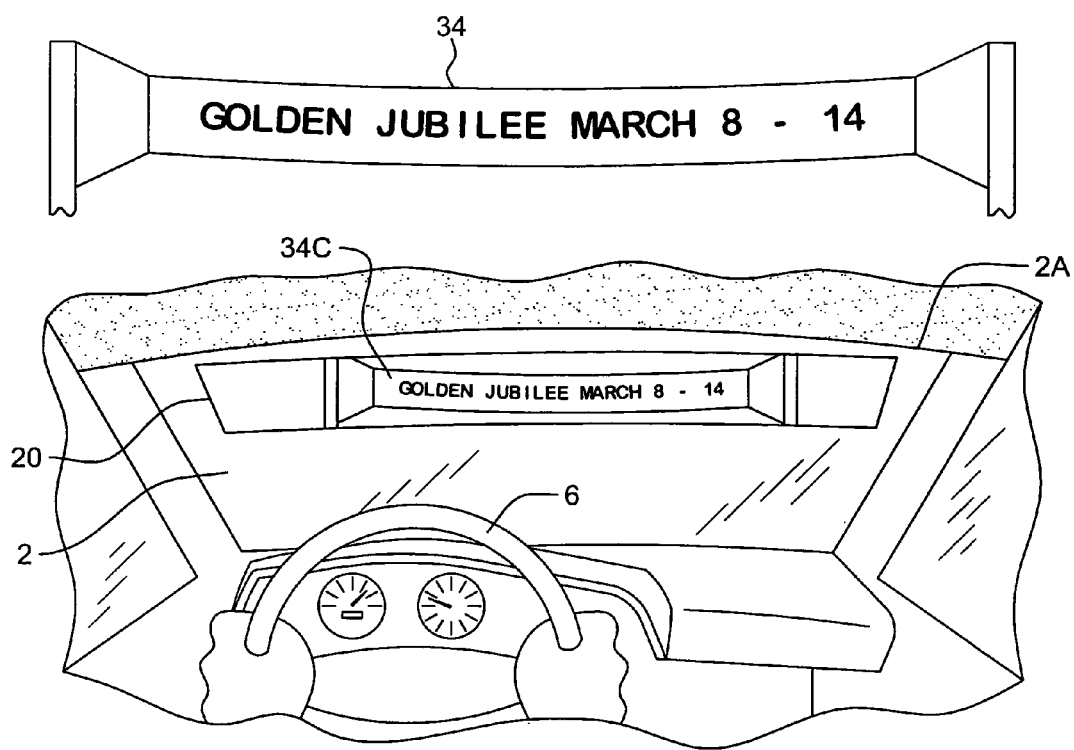
FIG. 8 shows a rear view of a motor vehicle windshield 2 showing an driver vision field extender formed with a third full windshield width embodiment of a Fresnel-type prism lens of the present invention.

FIG. 8 shows a rear view of a motor vehicle windshield 2 in front of driver's steering wheel 6, highlighting a re-directed view 34C of a street banner 34 positioned above the obstructed view line 2A at the top roof line of the windshield 2 of the driver of a motor vehicle. The re-directed view 34C of the street banner is shown directed through a full windshield width by an driver vision field extender formed with a Fresnel-type prism lens 20 (FIG. 5). The view is visible to both a driver and a passenger sitting in a passenger seat to the right of a driver of the motor vehicle.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

I claim:

1. A Fresnel lens-type vision-extending device for extending an automobile driver's visual field of view, comprising:
a plurality of prism lenses arranged on a front side of the device to be substantially in parallel, said lenses extending horizontally side to side linearly, wherein a back side of the device configured for attaching to the automobile windshield in a way that lines of the prism lenses substantially align with an upper horizontal edge of the windshield.

2. The Fresnel lens-type vision-extending device as recited in claim 1, wherein a length of the Fresnel lens-type vision-extending device is substantially equal to a horizontal length of the windshield.

3. The Fresnel lens-type vision-extending device as recited in claim 2, wherein device is configured to be positioned on the automobile windshield not less that 6" from upper horizontal edge of the windshield to avoid forward view distortion.

4. The Fresnel lens-type vision-extending device as recited in claim 1, wherein the device is formed of soft plastic.

5. The Fresnel lens-type vision-extending device as recited in claim 4, wherein the back side of the device is affixed to the inner surface of the automobile windshield by static cling.

6. The Fresnel lens-type vision-extending device as recited in claim 1, wherein a length of the device is adjustable by a user prior to affixation.

7. The Fresnel lens-type vision-extending device as recited in claim 6, wherein the length of the device is half the length of the upper horizontal edge of the windshield.

8. The Fresnel lens-type vision-extending device as recited in claim 1, wherein the device is configured to conform to a horizontal contour of the automobile windshield.

9. The Fresnel lens-type vision-extending device as recited in claim 8, wherein a concave shape of the device after affixation focuses the light defining and delineating overhead objects towards front-seated passengers such as the driver.

10. A method of using a Fresnel lens-type vision-extending device to extend an automobile driver's visual field of view, the vision-extending device having a front side comprising a plurality of prism lenses arranged on a front side of the device to be substantially in parallel and a back side of the device configured for attaching to the automobile windshield, the method comprising the steps of:

adjusting a length of the device;

attaching the length-adjusted device to the automobile windshield in a way that lines of the prism lenses substantially align with an upper horizontal edge of the windshield.

11. The method of using the Fresnel lens-type vision-extending device as recited in claim 10, wherein a length of the device is adjusted to be substantially equal to a horizontal length of the windshield.

12. The method of using the Fresnel lens-type vision-extending device as recited in claim 10, wherein a length of the device is adjusted to be substantially less that horizontal length of the windshield.

13. The method of using the Fresnel lens-type vision-extending device as recited in claim 10, wherein the device is formed of soft plastic and the step of attaching includes pressing the back side against the window to affix same by static cling.

14. The method of using the Fresnel lens-type vision-extending device as recited in claim 10, wherein the step of attachment includes positioning the device on the automobile windshield not less than 6" from an upper horizontal edge of the windshield to avoid forward view distortion.

15. The method of using the Fresnel lens-type vision-extending device as recited in claim 10, wherein the device is configured to conform to a horizontal contour of the automobile windshield at attachment.

16. The method of using the Fresnel lens-type vision-extending device as recited in claim 15, wherein a concave shape of the device after affixation focuses the light defining and delineating overhead objects towards front-seated passengers such as the driver.

* * * * *